US008245814B2

(12) United States Patent
Yao et al.

(10) Patent No.: US 8,245,814 B2
(45) Date of Patent: Aug. 21, 2012

(54) TRANSMISSION RATIO VARIABLE MECHANISM AND VEHICLE STEERING APPARATUS

(75) Inventors: Atsushi Yao, Kashihara (JP); Satoru Murao, Sakai (JP); Yoichiro Sankai, Kashiwara (JP)

(73) Assignee: JTekt Corporation, Osaka-Shi (JP)

( * ) Notice: Subject to any disclaimer, the term of this patent is extended or adjusted under 35 U.S.C. 154(b) by 99 days.

(21) Appl. No.: 13/000,484

(22) PCT Filed: Jun. 30, 2009

(86) PCT No.: PCT/JP2009/003026
§ 371 (c)(1),
(2), (4) Date: Dec. 21, 2010

(87) PCT Pub. No.: WO2010/001592
PCT Pub. Date: Jan. 7, 2010

(65) Prior Publication Data
US 2011/0108354 A1 May 12, 2011

(30) Foreign Application Priority Data

Jun. 30, 2008 (JP) .................................. 2008-171450

(51) Int. Cl.
*B62D 7/09* (2006.01)
*F16H 1/12* (2006.01)
(52) U.S. Cl. ....................................... 180/444; 475/163
(58) Field of Classification Search .................. 475/163
See application file for complete search history.

(56) References Cited

U.S. PATENT DOCUMENTS

| 3,895,540 | A | * | 7/1975 | Davidson ...................... 475/164 |
| 3,935,750 | A | * | 2/1976 | Maroth .............................. 74/61 |
| 4,326,748 | A | * | 4/1982 | Brusasco ...................... 297/362 |
| 6,286,391 | B1 | * | 9/2001 | Gassmann ...................... 74/650 |
| 8,148,705 | B2 | * | 4/2012 | Hirose et al. ............. 250/559.44 |
| 8,181,734 | B2 | * | 5/2012 | Shiina et al. .................. 180/444 |
| 2007/0261909 | A1 | | 11/2007 | Higashi et al. |

FOREIGN PATENT DOCUMENTS

JP          A 60-011749          1/1985
(Continued)

OTHER PUBLICATIONS

International Search Report issued in corresponding International Application No. PCT/JP2009/003026, mailed Sep. 1, 2009. (with English-language translation).

*Primary Examiner* — Tony Winner
(74) *Attorney, Agent, or Firm* — Oliff & Berridge, PLC

(57) ABSTRACT

A transmission ratio variable mechanism includes an input member and an output member, which are rotatable around a first axis, an inner ring arranged to connect the input and output members to each other so as to be differentially rotatable, an outer ring, and a motor. A second axis serving as a center axis of the inner ring and the outer ring is inclined to the first axis. The transmission ratio variable mechanism includes uneven engagement sections including a projection provided on one of each of end surfaces of the inner ring and a power transmission surface corresponding to the end surface, and a recess. The inner ring includes a first member forming the first end surface and a second member forming the second end surface. The first and second members are formed separately from each other and coupled to each other so as to be movable together.

16 Claims, 6 Drawing Sheets

FOREIGN PATENT DOCUMENTS

| | | |
|---|---|---|
| JP | A 10-184819 | 7/1998 |
| JP | A 2006-046405 | 2/2006 |
| JP | A 2006-082718 | 3/2006 |
| JP | A 2007-170624 | 7/2007 |
| JP | A 2007-274931 | 10/2007 |
| JP | A 2007-302197 | 11/2007 |
| JP | A 2008-030747 | 2/2008 |

* cited by examiner

TRANSMISSION RATIO VARIABLE MECHANISM AND VEHICLE STEERING APPARATUS

TECHNICAL FIELD

The present invention relates to a transmission ratio variable mechanism and a vehicle steering apparatus.

BACKGROUND ART

Examples of a transmission include one using an eccentric gear (see, e.g., Patent Document 1), one using a planet gear (see, e.g., Patent Document 2), and one using a swing gear (see, e.g., Patent Document 3). Patent Documents 2 and 3 discuss transmissions applied to a vehicle steering apparatus.

PRIOR DOCUMENT

Patent Document

Patent Document 1: Japanese Unexamined Patent Publication No. 10-184819
Patent Document 2: Japanese Unexamined Patent Publication No. 2007-302197
Patent Document 3: Japanese Unexamined Patent Publication No. 2006-82718

DISCLOSURE OF THE INVENTION

Problems to be Solved by the Invention

In Patent Document 3, the transmission includes first and fourth gears opposed to each other, and a swing gear arranged between the first and fourth gears and inclined to the first and fourth gears. The swing gear includes a second gear meshing with the first gear, and a third gear meshing with the fourth gear. The second and third gears are formed into a single member.

When the swing gear is formed, therefore, the second gear is formed on one end surface of a production intermediate of the swing gear, and the third gear is then formed on the other end surface of the production intermediate. At this time, the positioning of the third gear with respect to the second gear is to be set with high precision, which takes a lot of time and labor to manufacture the swing gear.

Solution to the Problem

The present invention has been made under such a background, and is directed to providing a transmission ratio variable mechanism and a vehicle steering apparatus capable of reducing time and labor required for manufacturing.

In order to attain the above-mentioned object, in a preferred aspect of the present invention, a transmission ratio variable mechanism includes an input member arranged to rotate around a first axis, an output member arranged to rotate around the first axis, a first bearing ring having first and second end surfaces and arranged to connect the input member and the output member so as to be differentially rotatable, a second bearing ring arranged to support the first bearing ring via a rolling element so as to be rotatable, and an actuator arranged to drive the second bearing ring to rotate. A second axis serving as a center axis of the first and second bearing rings is inclined to the first axis. Each of the input member and the output member includes a power transmission surface opposed to the corresponding end surface of the first bearing ring. The transmission ratio variable mechanism further includes uneven engagement sections arranged to engage each of the end surface of the first bearing ring and the power transmission surface corresponding to the end surface so as to be power-transmittable. The uneven engagement sections include a projection provided on one of each of the end surfaces of the first bearing ring and the power transmission surface corresponding to the end surface and a recess provided on the other surface and arranged to engage with the projection. The first bearing ring includes a first member forming the first end surface and a second member forming the second end surface. The first and second members are formed separately from each other and coupled to each other so as to be movable together.

According to the present embodiment, the projection or the recess of each of the first and second end surfaces of the first bearing ring is formed in the following manner, for example. More specifically, the production or the recess is formed by forming a projection or a recess on one end surface, corresponding to the first end surface, of a production intermediate of the first member, and forming a recess or a projection on one end surface, corresponding to the second end surface, of a production intermediate of the second member separately therefrom. In a configuration different from that in the present embodiment, when the projection or the recess is formed on the pair of end surfaces, opposed to each other, of a production intermediate of the first bearing ring composed of a single member, for example, time-consuming work, described below, is required. More specifically, time-consuming work for forming the projection or the recess on one of the end surfaces, and then forming the recess or the projection on the other end surface in the state of being positioned with high precision with respect to the projection or recess on the one end surface is required. On the other hand, according to this aspect, the first and second members can be separately formed. Therefore, the above-mentioned time-consuming work is not required.

The first bearing ring may be an inner ring, the inner ring may include an annular inner ring main body arranged to have an inner ring raceway formed on its outer periphery, and the first and second members may be fixed to the inner ring main body. In this case, the inner ring main body and the first and second members are separately formed. This enables the inner ring raceway to be formed by subjecting a production intermediate of the inner ring main body to cutting work or the like in a single-piece state. Time and labor required for manufacturing can be made less than when an inner ring is formed by forming an inner ring raceway in addition to forming a projection or a recess on a pair of end surfaces of a production intermediate of a first bearing ring composed of a single member, for example.

Each of the first and second members may include a cylindrical section fitted into the inner periphery of the inner ring main body, and an annular flange arranged to extend outward in a radial direction of the cylindrical section from one end of the cylindrical section and along a corresponding end surface of the inner ring main body, and the first and second end surfaces of the inner ring serving as the first bearing ring may be provided in each of the annular flanges. In this case, the inner ring main body can be sandwiched between the annular flange in the first member and the annular flange in the second member. This enables a coupling force between the inner ring main body and the first and second members to be made higher.

The one end surface of each of the annular flanges may be along the corresponding end surface of the inner ring main body in an axial direction of the second axis, and the other end surfaces of the annular flanges may be respectively the corresponding first and second end surfaces. In this case, a thrust force exerted on the corresponding end surface of the inner ring from the input member and a thrust force exerted on the corresponding end surface of the inner ring from the output member are a force for each of the annular flanges to fasten the inner ring main body as a whole. This enables a coupling force between the first and second members and the inner ring main body to be made higher.

Each of the outer peripheries of the cylindrical sections in the first and second members may include a press-fit unit that is press-fitted into the inner periphery of the inner ring main body and a relief recess that is recessed with respect to the press-fit unit, a clearance may be provided between the relief recess and the inner periphery of the inner ring main body, and the relief recesses in the first and second members may be arranged adjacent to each other between the press-fit units in the first and second members in an axial direction of the inner ring. In this case, the inner ring main body and the first and second members are press-fitted and coupled to each other. This enables coupling strength between the inner ring main body and the first and second members to be sufficiently ensured. The relief recess is provided. Thus, a variation in an inner clearance of the bearing, which is caused by the inner ring main body being pressed to the press-fit section, can be suppressed. Therefore, the inner clearance of the bearing is easy to manage.

The inner ring raceway and each of the relief recesses may be opposed to each other in a radial direction of the inner ring. In this case, the variation in the inner clearance of the bearing, which is caused by the inner ring main body being pressed to the press-fit section, can be more reliably suppressed. Therefore, the inner clearance of the bearing is easier to manage.

The cylindrical sections in the first and second members may respectively include opposite ends opposed to each other, and a fitting recess formed at one of the opposite ends and a fitting projection formed at the other end may be fitted into each other so that relative rotation between the first and second members is regulated. In this case, the relative rotation between the first and second members can be reliably regulated. As a result, respective phases of the projection or the recess formed on the first end surface and the recess or the projection formed on the second end surface can be inhibited from being shifted in the circumferential direction of the inner ring. Therefore, an ideal meshing state of the uneven engagement sections can be reliably maintained over a long period of time.

Each of the opposite ends may be formed in a rectangular wave shape extending in a circumferential direction of the cylindrical section when viewed in the radial direction of the cylindrical section. In this case, the relative rotation between the first and second members can be reliably regulated by fitting between the fitting recess and the fitting projection.

Each of the opposite ends may be formed in a triangular wave shape extending in a circumferential direction of the cylindrical section when viewed in the radial direction of the cylindrical section. In this case, the relative rotation between the first and second members can be reliably regulated by fitting between the fitting recess and the fitting projection in a triangular wave shape.

The actuator may include a motor for the transmission ratio variable mechanism, and the motor may include a rotor connected to the second bearing ring so as to be rotatable together around the first axis, and a stator arranged to surround the rotor. In this case, the second bearing ring is rotated around the first axis so that the first bearing ring can be rotated around the first axis. Thus, the first bearing ring can perform Coriolis motion (neck swing motion).

The uneven engagement sections may include first uneven engagement sections and second uneven engagement sections, the first uneven engagement sections may include a first projection provided on one of the power transmission surface of the input member and the first end surface of the first bearing ring, and a first recess provided on the other surface, and the second uneven engagement sections may include a second projection provided on one of the power transmission surface of the output member and the second end surface of the first bearing ring, and a second recess provided on the other surface. In this case, the first uneven engagement sections and the second uneven engagement sections are provided on both sides of the first bearing ring. This enables power to be transmitted between the input member and the output member.

The transmission ratio variable mechanism may further include a first shaft connected to the input member so as to be rotatable together, and a second shaft connected to the output member so as to be rotatable together, the first shaft and the second shaft respectively arranged to include opposite ends opposed to each other, and a supporting mechanism arranged to support each of the opposite ends so as to be relatively rotatable. In this case, axial runout at the opposite ends of the first and second shafts can be further reduced. Thus, eccentric rotation of the input member and the output member around the first axis can be reduced. As a result, an excessive force can be more reliably inhibited from being exerted on the first member and the second member in the first bearing ring from the input member and the output member. As a result, the relative positions of the first and second members can be reliably prevented from being shifted.

The supporting mechanism may include an annular section provided in the input member and arranged to surround the opposite end of the second shaft, and a bearing interposed between the annular section and the opposite end of the second shaft. In this case, the input member supports the first shaft while supporting the opposite end of the second shaft via the bearing. In such a simple configuration, the supporting mechanism can be realized at low cost. The eccentric rotation of the opposite ends of the shafts around the first axis can be more reliably suppressed.

A vehicle steering apparatus may include a steering member, a steerable wheel, and a transmission ratio variable mechanism arranged to change a transmission ratio serving as a ratio of a steered angle of the steerable wheel to a steering angle of the steering member, in which the above-mentioned transmission ratio variable mechanism may be used as the transmission ratio variable mechanism, the input member in the transmission ratio variable mechanism may connect to the steering member, and the output member in the transmission ratio variable mechanism may connect to the steerable wheel. In this case, the vehicle steering apparatus that is manufactured with little time and labor can be implemented.

The vehicle steering apparatus may further include a steering assist force application mechanism. In this case, the steering assist force need not be produced by the actuator arranged to drive the second bearing ring. Therefore, the actuator can be made low in cost and small in size.

The vehicle steering apparatus may further include a shaft interposed between the output member and the steerable wheel, in which the steering assist force application mechanism may include a second actuator arranged to generate a steering assist force, and a transmission mechanism arranged to transmit the steering assist force to the shaft. In this case, the steering assist force of the second actuator is transmitted to the steerable wheel via the shaft or the like and without via the transmission ratio variable mechanism. Therefore, a high torque from the second actuator can be prevented from being transmitted to the transmission ratio variable mechanism. Therefore, an allowable torque of each of the components in the transmission ratio variable mechanism can be made lower. As a result, the production cost of each of the components in the transmission ratio variable mechanism can be made lower. A torque exerted between the first and second members in the first bearing ring may be low. The relative positions of the first and second members can be more reliably prevented from being shifted.

BEST MODE FOR CARRYING OUT THE INVENTION

Preferred embodiments of the present invention will be described with reference to the accompanying drawings.

Figure 1:
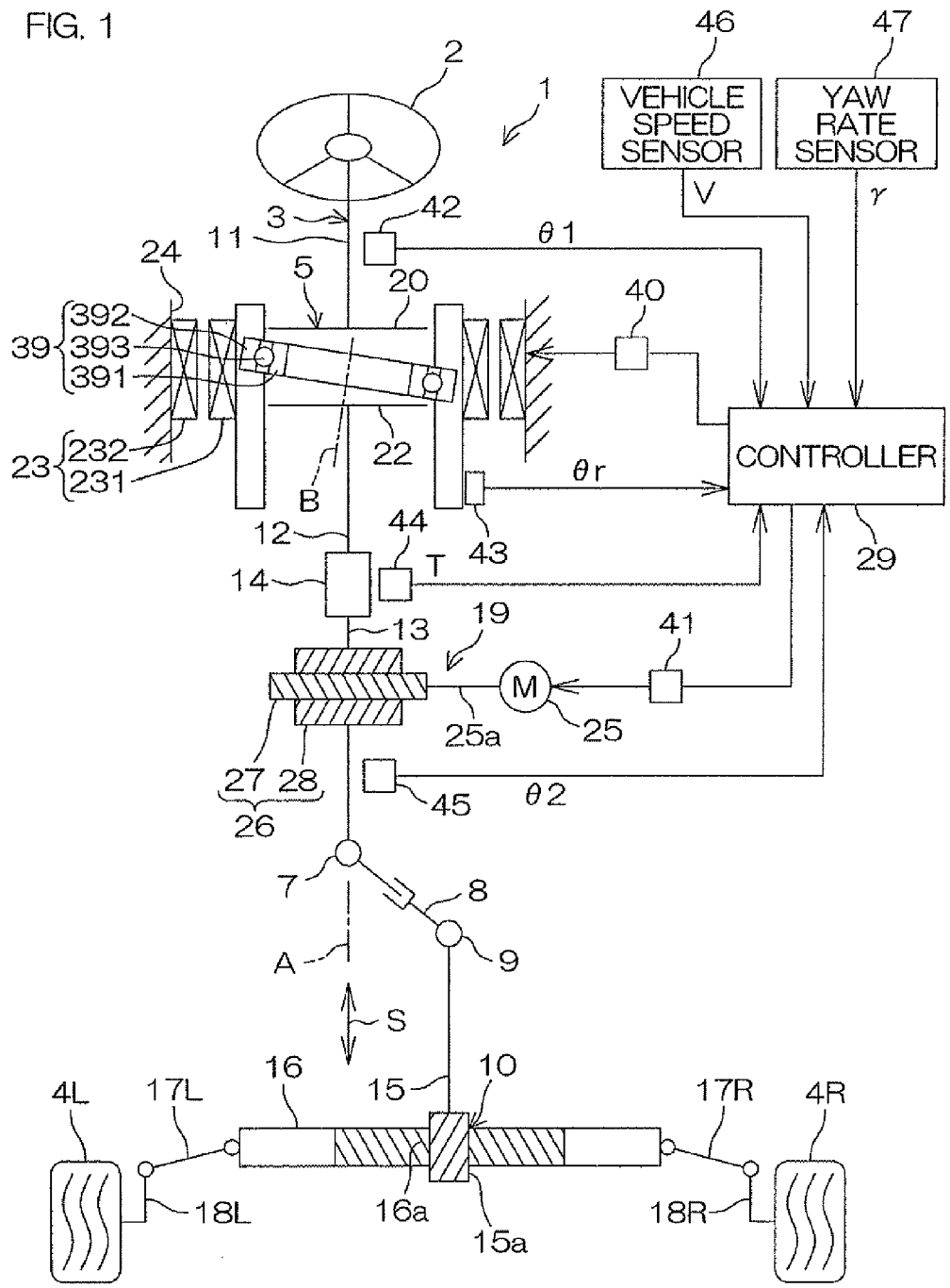
FIG. 1 is a schematic view illustrating a schematic configuration of a vehicle steering apparatus including a transmission ratio variable mechanism according to an embodiment of the present invention.

FIG. 1 is a schematic view illustrating a schematic configuration of a vehicle steering apparatus 1 including a transmission ratio variable mechanism according to an embodiment of the present invention. Referring to FIG. 1, the vehicle steering apparatus 1 applies a steering torque applied to a steering member 2 such as a steering wheel to each of right and left steerable wheels 4R and 4L via a steering shaft 3 or the like, to perform steering. The vehicle steering apparatus 1 has a variable gear ratio (VGR) function capable of changing a transmission ratio $\theta 2/\theta 1$ serving as a ratio of a steered angle $\theta 2$ of the steering wheel to a steering angle $\theta 1$ of the steering member 2.

The vehicle steering apparatus 1 includes the steering member 2 and the steering shaft 3 connecting to the steering member 2. The steering shaft 3 includes first to third shafts 11 to 13 arranged coaxially with one another. A center axis of the first to third shafts 11 to 13 is also a rotation axis of the first to third shafts 11 to 13.

The steering member 2 is connected to one end of the first shaft 11 so as to be rotatable together. The other end of the first shaft 11 and one end of the second shaft 12 are connected to each other via a transmission ratio variable mechanism 5 so as to be differentially rotatable. The other end of the second shaft 12 and one end of the third shaft 13 are elastically connected to each other so as to be relatively rotatable and power-transmittable within a predetermined range via a torsion bar 14.

The other end of the third shaft 13 connects to steering wheels 4R and 4L via a flexible joint 7, an intermediate shaft 8, a flexible joint 9, and a steering mechanism 10.

The steering mechanism 10 includes a pinion shaft 15 connecting to the flexible joint 9, and a rack shaft 16 having a rack 16a meshing with a pinion 15a at a leading end of the pinion shaft 15 and serving as a steering shaft extending in a right-to-left direction of the vehicle. Knuckle arms 18R and 18L are respectively connected to a pair of ends of the rack shaft 16 via tie rods 17R and 17L.

According to the above-mentioned configuration, rotation of the steering member 2 is transmitted to the steering mechanism 10 via the steering shaft 3 or the like. In the steering mechanism 10, rotation of the pinion 15a is converted into axial motion of the rack shaft 16. The axial motion of the rack shaft 16 is transmitted via the tie rods 17R and 17L to the corresponding knuckle arms 18R and 18L. As a result, the knuckle arms 18R and 18L respectively rotate. Thus, the steering wheels 4R and 4L connected to the corresponding knuckle arms 18R and 18L are respectively steered.

The transmission ratio variable mechanism 5 is a nutation gear mechanism arranged to change a rotation transmission ratio (transmission ratio $\theta 2/\theta 1$) between the first and second shafts 11 and 12 in the steering shaft 3. The transmission ratio variable mechanism 5 includes an input member 20 provided at the other end of the first shaft 11, an output member 22 provided at one end of the second shaft 12, and a bearing ring unit 39 serving as an intermediate member interposed between the input member 20 and the output member 22.

The input member 20 is connected to the steering member 2 and the first shaft 11 coaxially and so as to be rotatable together. The output member 22 is connected to the second shaft 22 coaxially and so as to be rotatable together. A first axis A is also a center axis and a rotation axis of the input member 20 and the output member 22.

The output member 22 connects to the steerable wheels 4R and 4L via the second shaft 12 and the steering mechanism 10 or the like.

The bearing ring unit 39 includes an inner ring 391 serving as a first bearing ring, an outer ring 392 serving as a second bearing ring, and a rolling element 393 such as a ball interposed between the inner ring 391 and the outer ring 392. The bearing ring unit 39 constitutes a four-point contact bearing.

As the rolling element 393, a cylindrical roller, a needle roller, and a tapered roller may be used instead of the ball. The rolling element 393 may be arranged in a single row, or may be arranged in a double row. If the rolling element 393 is arranged in a double row, the inner ring 391 can be prevented from falling with respect to the outer ring 392. An example of a bearing having the rolling element 393 arranged in a double-row is a double-row angular bearing.

The inner ring 391 connects the input member 20 and the output member 22 so as to be differentially rotatable. The inner ring 391 and the outer ring 392 have a second axis B serving as a center axis inclined to the first axis A. The second axis B is inclined at a predetermined angle of inclination to the first axis A. The inner ring 391 is rotatable around the second axis B by being rotatably supported on the outer ring 392 via the rolling element 393. The inner ring 391 is rotatable around the first axis A as a motor for the transmission ratio variable mechanism (hereinafter referred to as a transmission ratio variable mechanism motor) 23 serving as an electric motor that is an actuator arranged to drive the outer ring 392 is driven. The inner ring 391 and the outer ring 392 can perform Coriolis motion (neck swing motion) around the first axis A.

The transmission ratio variable mechanism motor 23 is arranged outside in a radial direction of the bearing ring unit 39, and the first axis A is a center axis. The transmission ratio variable mechanism motor 23 changes a transmission ratio θ2/θ1 by changing the speed of rotation of the outer ring 392 around the first axis A.

The transmission ratio variable mechanism motor 23 is composed of a brushless motor arranged coaxially with the steering shaft 3, for example. The transmission ratio variable mechanism motor 23 includes a rotor 231 arranged to hold the outer ring 392 in the bearing ring unit 39, and a stator 232 surrounding the rotor 231. The stator 232 is fixed to a housing 24 serving as a steering column. The rotor 231 rotates around the first axis A.

The vehicle steering apparatus 1 includes a steering assist force application mechanism 19 arranged to apply a steering assist force to the steering shaft 3. The steering assist force application mechanism 19 includes the second shaft 12 serving as an input shaft connecting to the output member 22 in the transmission ratio variable mechanism 5, the third shaft 13 serving as an output shaft connecting to the steering mechanism 10, a torque sensor 44 arranged to detect a torque to be transmitted to an area between the second shaft 12 and the third shaft 13, a steering assist motor 25 serving as a second actuator for steering assist, and a reduction gear mechanism 26 serving as a transmission mechanism interposed between the steering assist motor 25 and the third shaft 13.

The steering assist motor 25 generates a steering assist force, and includes an electric motor such as a brushless motor. An output of the steering assist motor 25 is transmitted as the steering assist force to the third shaft 13 via the reduction gear mechanism 26. The third shaft 13 is interposed in a torque transmission path between the output member 22 and the steerable wheels 4R and 4L.

The reduction gear mechanism 26 is a worm gear mechanism, for example, and includes a worm shaft 27 serving as a driving gear connected to an output shaft 25a in the steering assist motor 25, and a worm wheel 28 arranged to mesh with the worm shaft 27 and serving as a driven gear connected to the third shaft 13 so as to be rotatable together. The reduction gear mechanism 26 is not limited to the worm gear mechanism. For example, other gear mechanisms such as a gear pair mechanism with parallel axes using a spur gear and a helical gear may be used.

The transmission ratio variable mechanism 5 and the steering assist force application mechanism 19 are provided in the housing 24. The housing 24 is arranged in a cabin of the vehicle. The housing 24 may be arranged to surround the intermediate shaft 8, or may be arranged in an engine room of the vehicle.

Driving of each of the transmission ratio variable mechanism motor 23 and the steering assist motor 25 is controlled by a controller 29 including a central processing unit (CPU), a random access memory (RAM), and a read-only memory (ROM). The controller 29 is connected to the transmission ratio variable mechanism motor 23 via the driving circuit 40 while being connected to the steering assist motor 25 via a driving circuit 41.

Each of a steering angle sensor 42, a motor resolver 43 serving as rotation angle detection means arranged to detect a rotation angle of the transmission ratio variable mechanism motor 23, the torque sensor 44 serving as torque detection means, a steering angle sensor 45, a vehicle speed sensor 46, and a yaw rate sensor 47 is connected to the controller 29.

A signal relating to a rotation angle of the first shaft 11 is input from the steering angle sensor 42 to the controller 29 as a value corresponding to the steering angle θ1 serving as an operation amount of the steering member 2 from the position of the steering member 2 while the vehicle travels straight.

A signal relating to a rotation angle θr of the rotor 231 in the transmission ratio variable mechanism motor 23 is input from the motor resolver 43 to the controller 29.

A signal relating to a torque exerted between the second and third shafts 12 and 13 is input from the torque sensor 44 to the controller 29.

A signal relating to a rotation angle of the third shaft 13 is input as a value corresponding to the steered angle θ2 from the steering angle sensor 45 to the controller 29.

A signal relating to a vehicle speed V is input from the vehicle speed sensor 46 to the controller 29.

A signal relating to a yaw rate γ of the vehicle is input from the yaw rate sensor 47 to the controller 29.

The controller 29 controls the transmission ratio variable mechanism motor 23 and the steering assist motor 25 based on a signal of each of the sensors 42 to 47.

According to the above-mentioned configuration, an output of the transmission rate variable mechanism 5 is transmitted to the steering mechanism 10 via the steering assist force application mechanism 19. More specifically, the steering torque input to the steering member 2 is input to the input member 20 in the transmission ratio variable mechanism 5 via the first shaft 11, and is transmitted to the second shaft 12 in the steering assist force application mechanism 19 from the output member 22.

The steering torque transmitted to the second shaft 12 is transmitted to the torsion bar 14 and the third shaft 13, is combined with an output from the steering assist motor 25, and is further transmitted to the steering mechanism 10 via the intermediate shaft 8 or the like.

Figure 2:
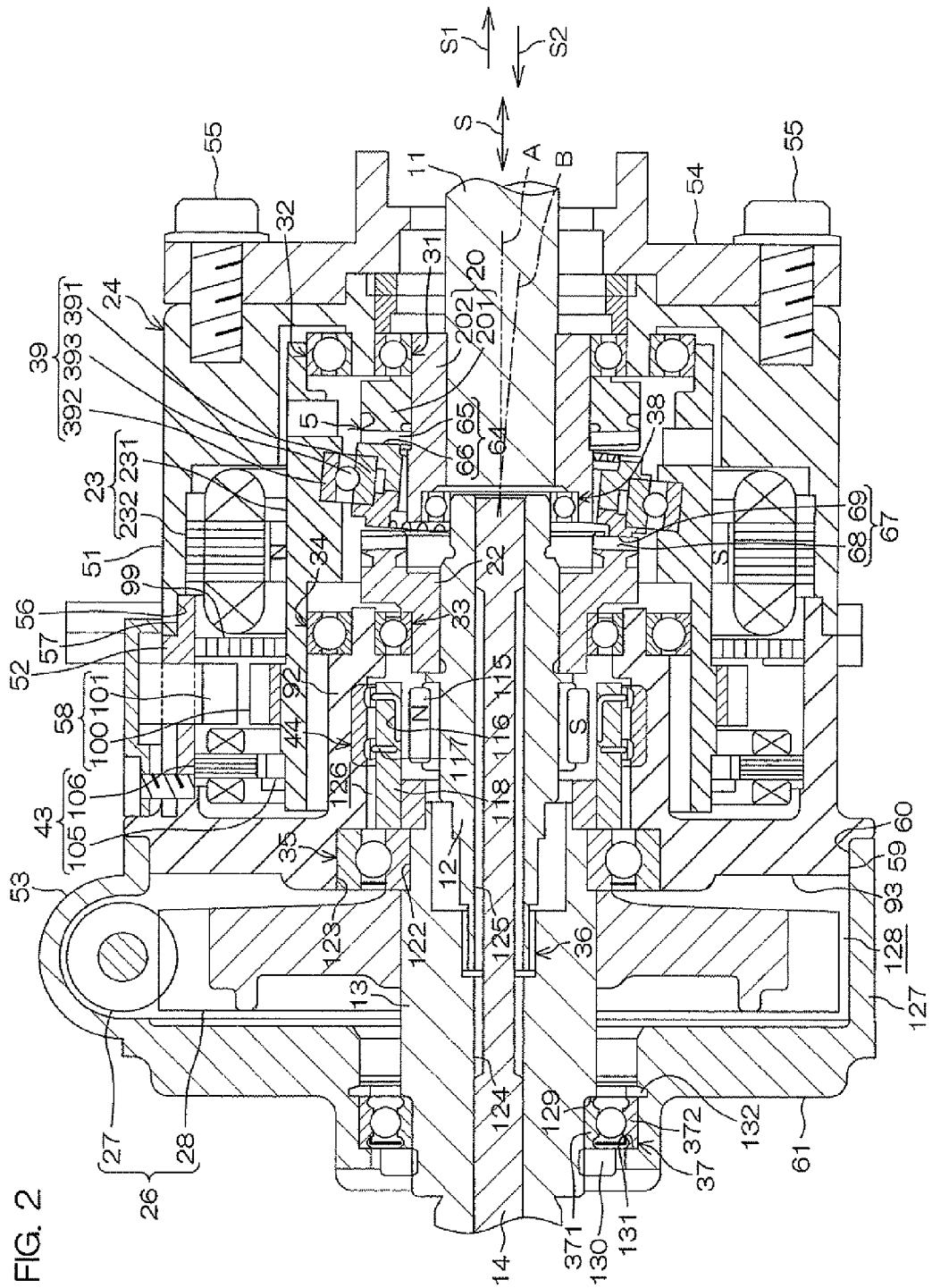
FIG. 2 is a cross-sectional view illustrating a more schematic configuration of a principal part of FIG. 1.

FIG. 2 is a cross-sectional view illustrating a more schematic configuration of a principal part of FIG. 1. Referring to FIG. 2, the housing 24 is formed in a cylindrical shape of a metal such as an aluminum alloy or the like, for example. The housing 24 includes first to third housings 51 to 53. The housing 24 houses first to eighth bearings 31 to 38. Each of the first to fifth bearings 31 to 35 and the seventh and eighth bearings 37 and 38 is a rolling bearing such as an angular contact ball bearing. A sixth bearing 36 is a rolling bearing such as a needle roller bearing.

The first housing 51 has a cylindrical shape, and constitutes a differential mechanism housing that houses the transmission ratio variable mechanism 5 serving as a differential mechanism while constituting a motor housing that houses the transmission ratio variable mechanism motor 23. One end of the first housing 51 is covered with an end wall member 54. One end of the first housing 51 and the end wall member 54 are fixed to each other using a fastening member 55 such as a bolt. An annular projection 57 at one end of the second housing 52 is fitted into an inner peripheral surface 56 at the other end of the first housing 51. The first and second housings 51 and 52 are fixed to each other using a fastening member (not illustrated) such as a bolt.

The second housing 52 has a cylindrical shape, and constitutes a sensor housing that houses the torque sensor 44 and a resolver housing that houses the motor resolver 43. The second housing 52 houses a bus bar 99, described below, in the transmission ratio variable mechanism motor 23, and a locking mechanism 58 arranged to lock the rotor 231 in the transmission ratio variable mechanism motor 23. An inner peripheral surface 60 at one end of the third housing 53 is fitted into an outer peripheral surface 59 at the other end of the second housing 52.

The third housing 53 has a cylindrical shape, and constitutes a reduction gear mechanism housing that houses the reduction gear mechanism 26. An end wall section 61 is provided at the other end of the third housing 53. The end wall section 61 has an annular shape, and covers the other end of the third housing 53.

Figure 3:
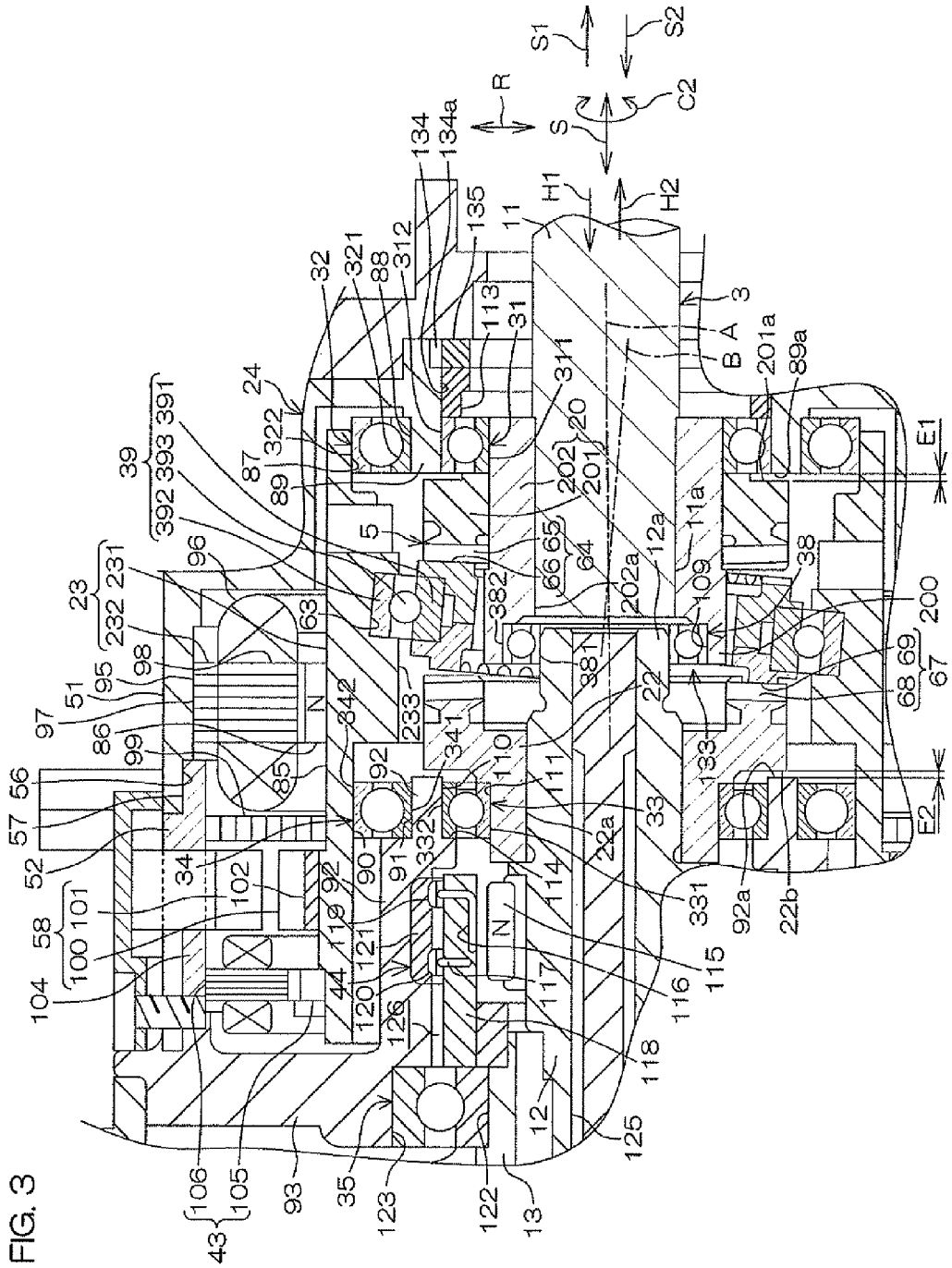
FIG. 3 is an enlarged view of the transmission ratio variable mechanism illustrated in FIG. 2 and its surroundings.

FIG. 3 illustrates an enlarged view of the transmission ratio variable mechanism illustrated in FIG. 2 and its surroundings. Referring to FIG. 3, each of the input member 20 and the output member 22 in the transmission ratio variable mechanism 5, and the inner ring 391 in the bearing ring unit 39 has an annular shape.

The input member 20 includes an input member main body 201, and a cylindrical member 202. The cylindrical member 202 is arranged inside in a radial direction of the input member main body 201, and is connected to the input member main body 201 so as to be rotatable together.

The first shaft 11 is connected to the cylindrical member 202 so as to be rotatable together by being inserted through an insertion hole 202a in the cylindrical member 202.

The second shaft 12 is connected to the output member 22 so as to be rotatable together by being inserted through an insertion hole 22a in the output member 22.

The first and second shafts 11 and 12 respectively include opposite ends 11a and 12a opposed to each other. The opposite ends 11a and 12a are supported by a supporting mechanism 133 so as to be coaxial and relatively rotatable. The supporting mechanism 133 includes the cylindrical member 202 in the input member 20, and the eighth bearing 38. That is, the cylindrical member 202 constitutes a part of the input member 20 while constituting a part of the supporting mechanism 133.

The cylindrical member 202 surrounds the respective opposite ends 11a and 12a of the first and second shafts 11 and 12. The cylindrical member 202 has one end opposed in its radial direction to the first bearing 31. The other end of the cylindrical member 202 is an annular section 200 opposed in the radial direction to the opposite end 12a of the second shaft 12. The annular section 200 surrounds the opposite end 12a of the second shaft 12 over its whole periphery.

A bearing holding hole 109 for the eighth bearing 38 is formed on the inner periphery of the annular section 200. The opposite end 12a of the second shaft 12 is inserted through the bearing holding hole 109. The eighth bearing 38 is interposed between the opposite end 12a of the second shaft 12 and the bearing holding hole 109 in the annular section 200. An inner ring 381 in the eighth bearing 38 is fitted into an outer peripheral surface of the opposite end 12a. An outer ring 382 in the eighth bearing 38 is fitted into the bearing holding hole 109. Thus, the eighth bearing 38 allows relative rotation between the cylindrical member 202 and the second shaft 12.

The opposite end 11a of the first shaft 11 may be inserted through the insertion hole 220 in the output member 22 while the eighth bearing 38 may be interposed between the output member 22 and the opposite end 11a of the first shaft 11.

The inner ring 391 is arranged outside in the radial direction of the cylindrical member 202. The outer ring 392 is held in an inclined hole 63 formed in an inner peripheral section 233 in the rotor 231 in the transmission ratio variable mechanism motor 23 so as to be rotatable together, and rotates around the first axis A together with the rotor 231. Relative movement of the outer ring 392 and the rotor 231 is regulated in an axial direction S of the steering shaft 3.

As the rotor 231 rotates around the first axis A, the bearing ring unit 39 performs Coriolis motion.

The outer ring 392 may connect the input member 20 and the output member 22 so as to be differentially rotatable, while the inner ring 391 may be connected to the rotor 231 in the transmission ratio variable mechanism motor 23 so as to be together rotatable. In this case, the bearing ring unit 39 is of an inner ring support type.

Figure 4:
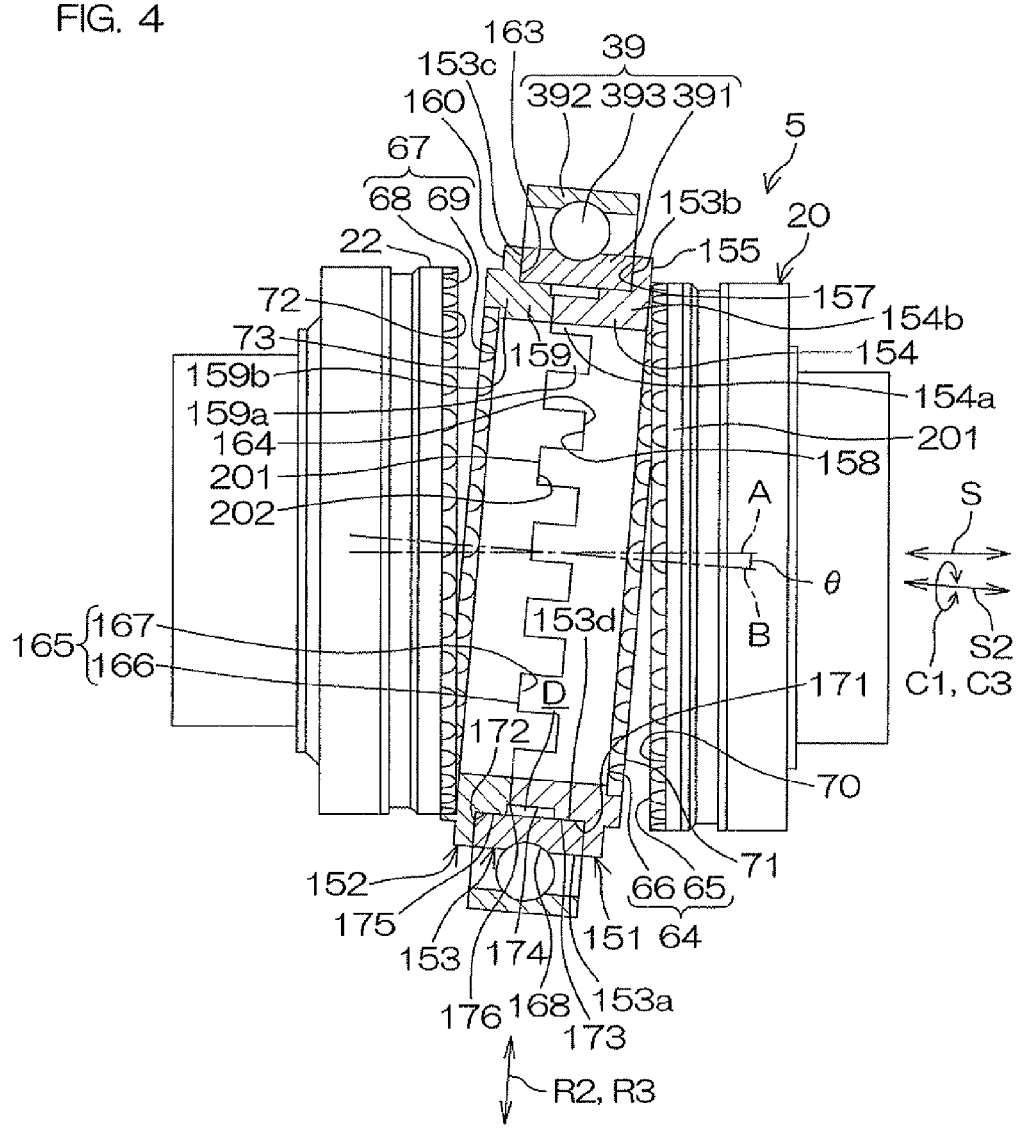
FIG. 4 is a side view illustrating a principal part of a transmission ratio variable mechanism in cross section.

FIG. 4 is a side view illustrating a principal part of the transmission ratio variable mechanism 5 in cross section. In FIG. 4, a side surface is illustrated for the input member 20 and the output member 22, and a cross section is illustrated for the bearing ring unit 39. The inner ring 391 in the bearing ring unit 39 includes a first member 151 in a cylindrical shape, a second member 152 in a cylindrical shape, and an inner ring main body 153 in an annular shape. The first member 151, the second member 152, and the inner ring main body 153 are respectively formed using separate members, and are coupled to one another so as to be rotatable together around the second axis B.

The first member 151 is arranged adjacent to the input member 20, and includes a first cylindrical section 154, and a first annular flange 155 provided at one end 154b of the first cylindrical member 154.

A first annular flange 155 extends radially outward with respect to the first cylindrical section 154. The first annular flange 155 includes a first end surface 71 and one end surface 157, which serve as a pair of end surfaces, in an axial direction S2 of the second axis B (hereinafter merely referred to as an axial direction S2). The other end surface, opposed to the input member 20, in the pair of end surfaces of the first annular flange 155 is the first end surface 71 of the inner ring 391. The one end surface 157 in the pair of end surfaces of the first annular flange 155 is opposed to the first end surface 71 in the axial direction S2. The one end surface 157 comes into surface contact with the one end surface 153b of the inner ring main body 153 over its whole periphery. An inner side surface 158 opposed to the second member 152 is formed at the other end 154a serving as an opposite end of the first cylindrical section 154.

The second member 152 is arranged adjacent to the output member 22, and includes a second cylindrical section 159, and a second annular flange 160 provided at one end 159b of the second cylindrical section 159.

The second annular flange 160 extends radially outward with respect to the second cylindrical section 159. The second annular flange 160 includes a second end surface 73 and one end surface 163, which serve as a pair of end surfaces, in the axial direction 52. The other end surface, opposed to the output member 22, in the pair of end surfaces of the second annular flange 160 is the second end surface 73 of the inner ring 391. The one end surface 163 in the pair of end surfaces of the second annular flange 160 is opposed to the second end surface 73 in an axial direction S1. The one end surface 163 is in surface contact with the other end surface 153e of the inner ring main body 153 over its whole periphery. An inner side surface 164 opposed to the first member 151 is formed at the other end 159a serving as an opposite end of the second cylindrical section 159. The other end 159a of the second cylindrical section 159 and the other end 154a of the first cylindrical section 154 are relatively opposed to each other in the axial direction S2.

The first and second cylindrical sections 154 and 159 include a regulation structure 165 for regulating relative rotation in a circumferential direction C1 of the inner ring 391 (hereinafter merely referred to as a circumferential direction C1). The regulation structure 165 arranged to include a first rugged section 166 formed on the inner side surface 158 of the first cylindrical section 154, and a second rugged section 167 provided on the inner side surface 164 of the second cylindrical section 159.

The first and second rugged sections 166 and 167 are respectively formed over the whole peripheries in the circumferential direction C1 of the corresponding inner side surfaces 158 and 164. The first and second rugged sections 166 and 167 have a wave shape. In the present embodiment, the first and second rugged sections 166 and 167 respectively form rectangular wave shapes. The first and second rugged sections 166 and 167 concavo-convexly engage with each other, and contact each other without any clearance in the circumferential direction C1.

The other end 154a (159a) of the first cylindrical section 154 (the second cylindrical section 159) is formed in a rectangular wave shape arranged to extend in a circumferential direction C3 of the first cylindrical section 154 (second cylindrical section 159) when viewed in a radial direction R2 of the first cylindrical section 154 (second cylindrical section 159). The respective shapes of edges of the other ends 154a and 159a match each other when viewed in the radial direction R2. Thus, a fitting projection 201 is formed at the other end 154a of the first cylindrical section 154. A fitting recess 202 is formed at the other end 159a of the second cylindrical section 159.

The fitting projection 201 and the fitting recess 202 are respectively formed in rectangular wave shapes arranged to extend in the circumferential direction C3 when viewed in the radial direction R2. The fitting projection 201 and the fitting recess 202 are fitted into each other so, that relative rotation between the first and second members 151 and 152 in the circumferential direction C3 is regulated.

The arrangements of the fitting projection 201 and the fitting recess 202 may be replaced with each other.

An inner ring raceway 168 is formed on an outer peripheral surface 153a of the inner ring main body 153. The inner ring raceway 168 is a raceway surface through which the rolling element 393 passes, and has a circular arc shape in cross section. The inner ring main body 153 is fixed to the first and second members 151 and 152.

More specifically, the one end surface 153b of the inner ring main body 153 is along the first annular flange 155, and is in surface contact with the one end surface 157 of the first annular flange 155. The other end surface 153c of the inner ring main body 153 is along the second annular flange 160, and is in surface contact with the one end surface 163 of the second annular flange 160.

An inner peripheral surface 153d of the inner ring main body 153 is press-fitted and fixed to each of outer peripheral surfaces 171 and 172 of the first and second cylindrical sections 154 and 159. More specifically, a first press-fit section 173 and a first relief recess 174 are provided on the outer peripheral surface 171 of the first cylindrical section 154. A second press-fit section 175 and a second relief recess 176 are provided on the outer peripheral surface 172 of the second cylindrical section 159.

In the axial direction S2, the first press-fit section 173 is arranged at a position relatively farther away from the second member 152, and the first relief recess 174 is arranged at a position relatively closer to the second member 152. The first press-fit section 173 has a relatively large diameter, and is press-fitted and fixed to the inner peripheral surface 153d of the inner ring main body 153. The first relief recess 174 has a relatively small diameter so that a clearance D is formed between the first relief recess 174 and the inner peripheral surface 153d of the inner ring main body 153, and is not in contact with the inner peripheral surface 153d. That is, the first relief recess 174 is recessed with respect to the first press-fit section 173.

In the axial direction S2, the second press-fit section 175 is arranged at a position relatively farther away from the first member 151, and the second relief recess 176 is arranged at a position relatively closer to the first member 151. The second press-fit section 175 has a relatively large diameter, and is press-fitted and fixed to the inner peripheral surface 153d of the inner ring main body 153. The second relief recess 176 has a relatively small diameter so that a clearance D is formed between the second relief recess 176 and the inner peripheral surface 153d of the inner ring main body 153, and is not in contact the inner peripheral surface 153d. That is, the second relief recess 176 is recessed with respect to the second press-fit section 175.

The first and second relief recesses 174 and 176 are adjacent to each other in the axial direction S2, and the first and second relief recesses 174 and 176 form the clearance D.

In the axial direction S2, the positions of the first and second relief recesses 174 and 176 are associated with the position of the inner ring raceway 168. More specifically, in the axial direction S2, the length of the inner ring raceway 168 and the length of the first and second relief recesses 174 and 176 are made equal to each other. In the axial direction S2, the positions at respective one ends of the inner ring raceway 168 and the first and second relief recesses 174 and 176 are substantially lined up with each other while the positions at their respective other ends are substantially lined up with each other.

According to the above-mentioned configuration, in the axial direction S2, the first and second relief recesses 174 and 176 are arranged adjacent to each other between the first and second press-fit sections 173 and 175. In the radial direction R3 of the inner ring 391, the inner ring raceway 168 and the first and second relief recesses 174 and 176 are opposed to each other.

The input member main body 201 and the first member 151 in the inner ring 391 are provided with first uneven engagement sections 64. This enables power to be transmitted between the input member 20 and the inner ring 391. The second member 152 in the inner ring 391 and the output member 22 are provided with second uneven engagement sections 67. This enables power to be transmitted between the inner ring 391 and the output member 22.

The first uneven engagement sections 64 include a first projection 65 formed on a power transmission surface 70 serving as one end surface of the input member main body 20, and a first recess 66 formed on the first end surface 71 of the inner ring 391 and arranged to engage with the first projection 65. The first projection 65 and the first recess 66 are formed over respective whole areas in the circumferential direction of the corresponding power transmission surface 70 and first end surface 71. Each of the first projections 65 has a semicircular shape in cross section, for example. Each of the first recesses 66 has a shape that substantially matches the first projection 65.

The power transmission surface 70 and the first end surface 71 are opposed to each other in an axial direction S of the steering shaft 3 (hereinafter merely referred to as an axial direction S), and the first uneven engagement sections 64 engage the power transmission surface 70 and the first end surface 71 so as to be power-transmittable.

The number of first projections is 38, for example. The number of first recesses 66 differs from the number of first projections 65. Differential rotation can be generated between the input member main body 201 and the inner ring 391 depending on a difference between the number of first projections 65 and the number of first recesses 66.

Figure 6:
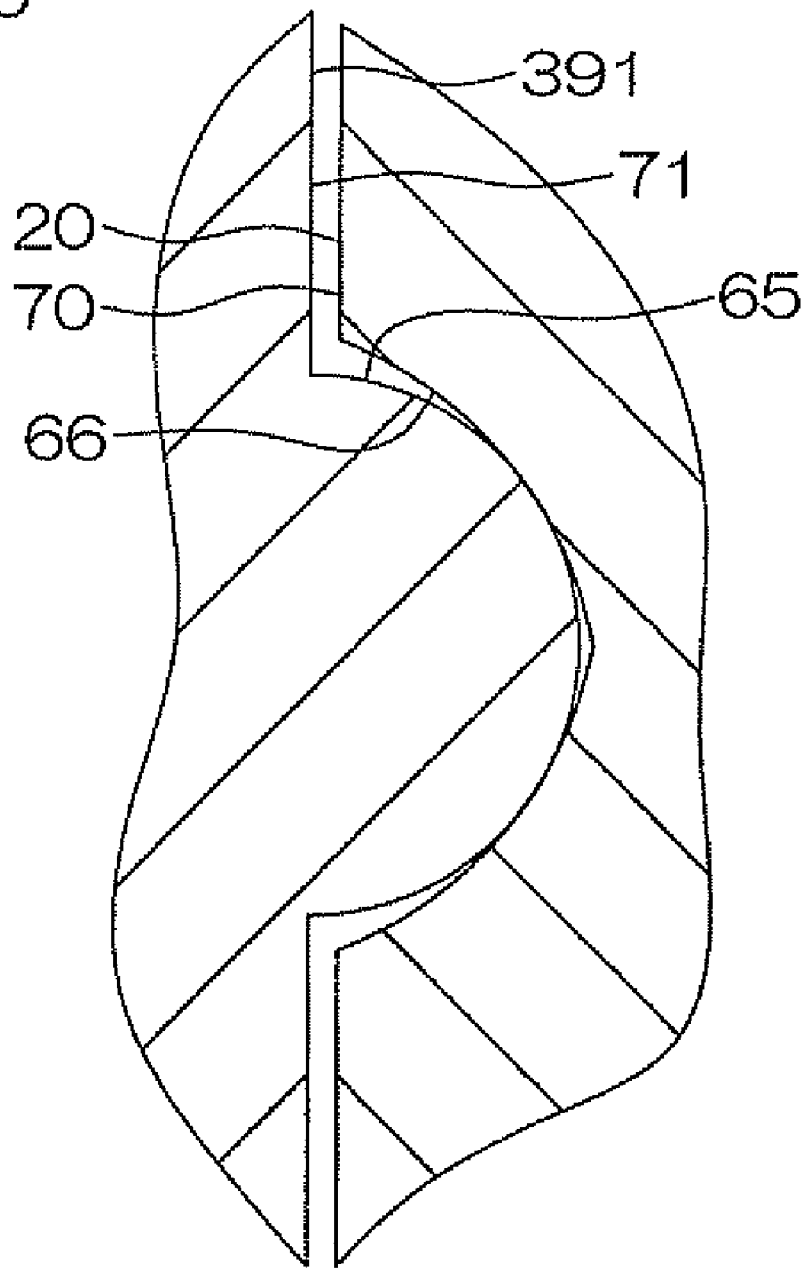
FIG. 6 is a cross-sectional view of a principal part according to still another embodiment of the present invention.

As illustrated in FIG. 6, an arrangement of the first projection 65 and an arrangement of the first recess 66 may be replaced with each other. In this case, the first projection 65 is formed on the first end surface 71 of the inner ring 391, and the first recess 66 is formed on the power transmission surface 70 of the input member 20.

Referring to FIG. 4 again, the second uneven engagement sections 67 include a second projection 68 formed on a power transmission surface 72 serving as one end surface of the output member 22, and a second recess 69 formed on the second end surface 73 of the inner ring 391 and arranged to engage with the second projection 68. The power transmission surface 72 and the second end surface 73 are opposed to each other in the axial direction S, and the second uneven engagement sections 67 engage the power transmission surface 72 and the second end surface 73 so as to be power-transmittable.

The second projection 68 in the second uneven engagement sections 67 has a similar configuration to that of the first projection 65 in the first uneven engagement sections 64. The second recess 69 has a similar configuration to that of the first recess 66. More specifically, the power transmission surface 72 of the output member 22 has a similar configuration to that of the power transmission surface 70 of the input member main body 201, and the second end surface 73 of the inner ring 391 has a similar configuration to that of the first end surface 71 of the inner ring 391. Therefore, details of the second uneven engagement sections 67 are omitted.

The second axis B of the inner ring 391 is inclined by a predetermined angle θ to a first axis A of the input member 20 and the output member 22 so that some of the first projections 65 and some of the first recesses 66 engage with each other. Some of the second projections 68 and some of the second recesses 69 engage with each other.

Bevel gears may be respectively formed on the power transmission surface 70 of the input member main body 201 and the first end surface 71 of the inner ring 391, to constitute first uneven engagement sections, and bevel gears may be respectively formed on the second end surface 73 of the inner ring 391 and the power transmission surface 72 of the output member 22, to constitute second uneven engagement sections. In this case, a first projection and a second projection are respectively formed of teeth of the bevel gears, and a first recess and a second recess are respectively formed of grooves between the teeth of the bevel gears.

Referring to FIG. 3, the rotor 231 in the transmission ratio variable mechanism motor 23 includes a cylindrical rotor core 85 arranged to extend in the axial direction S, and a permanent magnet 86 fixed to an outer peripheral surface of the rotor core 85. The rotor core 85 houses the torque sensor 44. The rotor core 85 surrounds both the first uneven engagement sections 64 and the second uneven engagement sections 67 over their whole peripheries while surrounding the torque sensor 44 over its whole periphery.

The length of the housing 24 in the axial direction S can be reduced by housing the transmission ratio variable mechanism 5 and the torque sensor 44 in the rotor core 85. As a result, a shock absorption stroke for absorbing a shock in secondary collision of the vehicle can be kept long in the axial direction S. An arrangement space of a tilt telescopic mechanism (not illustrated) provided adjacent to the housing 24 can be kept larger.

A hole-to-be-held 87 for the second bearing 32 is formed at one end of the rotor core 85. An annular bearing holding section 88 is provided inside in a radial direction of the hole-to-be-held 87. The bearing holding section 88 is arranged in an annular projection 89 formed at one end of the first housing 51. A second bearing 32 is interposed between the hole-to-be-held 87 and the bearing holding section 88. Thus, one end of the rotor core 85 is rotatably supported on the first housing 51.

A hole-to-be-held 90 for a fourth bearing 34 is formed in an intermediate portion of the rotor core 85. An annular bearing holding section 91 is provided inside in a radial direction of the hole-to-be-held 90. The bearing holding section 91 is arranged in an annular extension section 92 formed at one end of the second housing 52. The annular extension section 92 has a cylindrical shape arranged to extend toward one side S1 of the axial direction S from a bulkhead section 93 provided at the other end of the second housing 52, and is inserted through the rotor core 85.

The fourth bearing 34 is interposed between the hole-to-be-held 90 and the bearing holding section 91. Thus, the intermediate portion of the rotor core 85 is rotatably supported on the annular extension section 92 in the second housing 52. The second and fourth bearings 32 and 34 are arranged with the bearing ring unit 39 sandwiched therebetween in an axial direction of the rotor 231. The pair of bearings 32 and 34 supports the rotor core 85 at two points in the axial direction S.

The permanent magnet 86 in the rotor 231 has magnetic poles that alternately differ in a circumferential direction C2 of the steering shaft 3. The permanent magnet 86 has N poles and S poles alternately equally spaced apart from each other in the circumferential direction C2. The permanent magnet 86 is fixed to an outer peripheral surface of the intermediate portion of the rotor core 85. The permanent magnet 86 and a part of the transmission ratio variable mechanism 5 overlap each other at their positions in the axial direction S.

The stator 232 in the transmission ratio variable mechanism motor 23 is housed in the first housing 51.

The stator 232 includes a stator core 95 obtained by stacking a plurality of electromagnetic steel plates, and an electromagnetic coil 96.

The stator core 232 includes an annular yoke 97, and a plurality of teeth 98 equally spaced apart from one another in a circumferential direction of the yoke 97 and arranged to project inward in a radial direction of the yoke 97. An outer peripheral surface of the yoke 97 is fixed to an inner peripheral surface of the first housing 51 by shrinkage fit or the like. The electromagnetic coil 96 is wound around each of the teeth 98.

A bus bar 99 is arranged on the other side 52 of the axial direction S with respect to the stator 232. The bus bar 99 is housed in the second housing 52 in the state of having an annular shape as a whole, and is connected to each of the electromagnetic coils 96 in the transmission ratio variable mechanism motor 23. The bus bar 99 supplies power from a driving circuit to each of the electromagnetic coils 96. The bus bar 99 and parts of third and fourth bearings 33 and 34 overlap each other at their positions in the axial direction S.

A locking mechanism 58 is arranged on the other side S2 of the axial direction S with respect to the bus bar 99. The locking mechanism 58 regulates the rotation of the rotor 231 in the transmission ratio variable mechanism motor 23, and is housed at one end of the second housing 52.

The locking mechanism 58 includes a section-to-be-regulated 100 rotatable together with the rotor core 85, and a regulation section 101 arranged to engage with the section-to-be-regulated 100 to regulate the rotation of the section-to-be-regulated 100. The section-to-be-regulated 100 is an annular member. A recess 102 is formed on an outer peripheral surface of the section-to-be-regulated 100. One or a plurality of recesses 102 are formed in a circumferential direction of the section-to-be-regulated 100. The rotor core 85 may be directly provided with the recess 102. In this case, the rotor core 85 constitutes the above-mentioned section-to-be-regulated 100. A part of the section-to-be-regulated 100 overlaps a part of the torque sensor 44 at its position in the axial direction S.

The regulation section 101 is arranged outside in a radial direction of the section-to-be-regulated 100. The regulation section 101 is held in the second housing 52, and is movable toward the section-to-be-regulated 100. The regulation section 101 moves toward the section-to-be-regulated 100, to engage with the recess 102 so that the rotation of the rotor core 85 is regulated.

A motor resolver 43 is arranged on the other side S2 of the axial direction. S with respect to the locking mechanism 58. The motor resolver 43 is housed in the second housing 52, and is positioned outside in a radial direction of the rotor core 85.

A part of the motor resolver 43 and a part of the torque sensor 44 overlap each other at their positions in the axial direction S. The motor resolver 43 includes a resolver rotor 105 and a resolver stator 106. The resolver rotor 105 is fixed to an outer peripheral surface at the other end of the rotor core 85 so as to be rotatable together. The resolver stator 106 is fixed to the second housing 52.

The first shaft 11 is rotatably supported on the first housing 51 via the cylindrical member 202 in the input member 20 and the first bearing 31. The second bearing 32 surrounds the first bearing 31. The positions of the first bearing 31 and the second bearing 32 are lined up with each other in the axial direction S.

The third bearing 33 is interposed between a bearing holding hole 110 and a bearing holding section 111. The bearing holding hole 110 is formed on the inner periphery at a leading end of the extension section 92 in the second housing 52. The bearing holding section 111 is formed on the outer periphery of the output member 22. The output member 22 is rotatably supported on the annular extension section 92 in the second housing 52 via the third bearing 33. The fourth bearing 34 surrounds the third bearing 33. The positions of the third bearing 33 and the fourth bearing 34 are lined up with each other in the axial direction S.

A pre-load is applied to each of the first uneven engagement sections 64 and the second uneven engagement sections 67. This enables a smooth engagement between the first projection 65 and the first recess 66 and a smooth engagement between the second projection 68 and the second recess 69.

More specifically, an elastic member 113 serving as an urging member is arranged at one end of the first housing 51. The elastic member 113 is formed of a belleville spring, for example. The elastic member 113 urges the input member main body 201 in the urging direction H1 serving as a direction in which the input member main body 201 is brought closer to the output member 22 (toward the other side S2 of the axial direction S). The elastic member 113 may be a wave washer formed in a wave shape, or may be another elastic member such as a ring made of resin.

The elastic member 113 urges the input member main body 201 toward the output member 22. Thus, a pre-load is applied to each of the first uneven engagement sections 64 and the second uneven engagement sections 67.

The elastic member 113 is held in a bearing holding hole 134. The bearing holding hole 134 is formed on the inner periphery of the annular projection 89 at one end of the first housing 51. The elastic member 113 urges (presses) one end surface of an outer ring 312 in the first bearing 31 held in the bearing holding hole 134 in the urging direction H1. The outer ring 312 in the first bearing 31 is fitted into the bearing holding hole 134 so as to be relatively movable in the axial direction S. A cover member 135 is provided adjacent to the elastic member 113. The cover member 135 is screwed into a female screw section 134a formed in the bearing holding hole 134. The cover member 135 receives the elastic member 113, and regulates movement of the urging member 113 in a direction H2 opposite to the urging direction H1.

An inner ring 311 in the first bearing 31 is press-fitted and fixed to one end of the cylindrical member 202. The cylindrical member 202 and the input member main body 201 are rotatable together and movable together in the axial direction S. The inner ring 311 urges the input member main body 201 in the urging direction H1 upon receipt of an urging force of the elastic member 113.

The first projection 65 in the first uneven engagement sections 64 is opposed to the first recess 66 in the urging direction H1. Similarly, the second recess 69 in the second uneven engagement sections 67 is opposed to the second projection 68 in the urging direction H1. An inner ring 331 in the third bearing 33 is press-fitted and fixed to the output member 22.

An outer ring 332 in the third bearing 33 is loose-fitted into the bearing holding hole 110, and is movable in the axial direction S relative to the bearing holding hole 110. The outer ring 332 in the third bearing 33 is received in an annular step 114 arranged adjacent to the bearing holding hole 110, and movement of the outer ring 332 in the urging direction H1 is regulated.

According to the above-mentioned configuration, an urging force of the elastic member 113 is transmitted to the inner ring 311 via the outer ring 312 and a rolling element in the first bearing 31, and is further transmitted to the input member 20. The urging force transmitted to the input member 20 is transmitted to the first uneven engagement sections 64, the second uneven engagement sections 67, and the output member 22 in this order, and is further transmitted to the inner ring 331, a rolling element, and the outer ring 332 in the third bearing 33. The urging force transmitted to the outer ring 332 in the third bearing 33 is received by the annular step 114.

As the inner ring 391 in the bearing ring unit 39 moves in the axial direction S by the urging force of the elastic member 113, the rolling element 393 and the outer ring 392 in the bearing ring unit 39, and the rotor 231 in the transmission ratio variable mechanism motor 23 move together in the axial direction S.

More specifically, the outer ring 392 in the bearing ring unit 39 is press-fitted and fixed to the inclined hole 63 in the rotor core 85.

Respective outer rings 322 and 342 of the second bearing 32 and the fourth bearing 34 are loose-fitted into the corresponding annular holes-to-be-held 87 and 90 in the rotor core 85, and supports the rotor core 85 so as to be relatively movable in the axial direction S. An inner ring 321 in the second bearing 32 is press-fitted and fixed to the bearing holding section 88 in the annular projection 89. An inner ring 341 in the fourth bearing 34 is press-fitted and fixed to the bearing holding section 91 in the annular extension section 92 in the second housing 52.

According to the above-mentioned configuration, the input member 20 and the output member 22 are movable in the urging direction H1 and the direction H2 opposite thereto (the axial direction S) relative to the bearing ring unit 39.

In the present embodiment, an upper limit of an amount by which the input member 20 and the output member 22 are movable in the axial direction S relative to the housing 24.

More specifically, a leading end surface 89a of the annular projection 89 in the first housing 51 is opposed in the axial direction S to an annular surface 201a of the input member main body 201. Similarly, a leading end surface 92a of the annular extension section 92 in the second housing 24 is opposed in the axial direction S to an annular surface 22b of the output member 22.

In an initial state before shipment from a factory, for example, a predetermined clearance E1 is provided between the leading end surface 89a of the annular projection 89 and the annular surface 201a of the input member main body 201. Similarly, in the initial state, a predetermined clearance E2 is provided between the leading end surface 92a of the annular extension section 92 and the annular surface 22b of the output member 22.

The clearances E1 and E2 are set, as needed, so that no tooth jumping (sliding) occurs in the first uneven engagement sections 64 and no tooth jumping (sliding) occurs in the second uneven engagement sections 67 even when the input member 20 and the output member 22 move in the axial direction S relative to the inner ring 391.

This enables the input member 20 and the output member 22 to excessively move in the axial direction S relative to the inner ring 391. As a result, a state where the first projection 65 and the first recess 66 in the first uneven engagement sections 64 reliably engage with each other can be maintained. Therefore, tooth jumping (sliding) can be prevented from occurring between the first projection 65 and the first recess 66.

A state where the second projection 68 and the second recess 69 in the second uneven engagement sections 67 reliably engage with each other can be maintained. Therefore, tooth jumping (sliding) can be prevented from occurring between the second projection 68 and the second recess 69.

The output member 22 may be urged in a direction nearer to the input member 20 (in the direction H2 opposite to the urging direction H1) using the elastic member 113. In this case, the elastic member 113 is held in the bearing holding hole 110 arranged to hold the third bearing 33, and is sandwiched between the annular step 114 and the outer ring 332 in the third bearing 33. An urging force of the elastic member 113 is transmitted to the third bearing 33, the output member 22, the second uneven engagement sections 67, the first uneven engagement sections 64, the input member 20, the inner ring 311, a rolling element, and the outer ring 312 in the first bearing 31, and the cover member 135 in this order, and is received by the first housing 51.

As described above, pre-loads are respectively applied to the first and second uneven engagement sections 64 and 67 using the elastic member 113. Such a configuration enables a constant pressure pre-loading structure serving as a structure in which pre-loads to the first and second uneven engagement sections 64 and 67 can be made substantially constant to be implemented. Therefore, pre-load control at the time of manufacturing can be made easy.

As described above, a structure in which amounts of movement in the axial direction S of the input member 20 and the output member 22 relative to the inner ring 391 can be regulated is used. Even when a significantly great force is input from a steered wheel or the like to each of the first and second uneven engagement sections 64 and 67, and the input member 20 and the output member 22 are displaced in the axial direction S, for example, sliding can be reliably prevented from occurring between the projections 65 and 68 and the corresponding recesses 66 and 69.

The supporting mechanism 133 is arranged not to prevent the inner ring 391 from being displaced in the axial direction S. More specifically, the outer ring 382 in the eighth bearing 38 in the supporting mechanism 133 is loose-fitted into the bearing holding hole 109 in the cylindrical member 202 so that it is movable in the axial direction S relative to the bearing holding hole 109. The inner ring 381 in the eighth bearing 38 is press-fitted and fixed to the opposite end 12a of the second shaft 12. The outer ring 382 in the eighth bearing 38 may be press-fitted and fixed to the bearing holding hole 109, and the inner ring 381 in the eighth bearing 38 may be loose-fitted into the opposite end 12a.

The torque sensor 44 is arranged inside in a radial direction of the rotor core 85 in the transmission ratio variable mechanism motor 23. The torque sensor 44 includes a multipole magnet 115 fixed to an intermediate portion of the second shaft 12, and magnetic yokes 116 and 117 supported at one end of the third shaft 13. The magnetic yokes 116 and 117 are a pair of soft magnetic materials arranged in a magnetic field generated by the multipole magnet 115 for forming a magnetic circuit.

The multipole magnet 115 is a cylindrical permanent magnet, and has a plurality of poles (N poles and S poles in the same number) magnetized, equally spaced apart in its circumferential direction.

The magnetic yokes 116 and 117 surround the multipole magnet 115. Each of the magnetic yokes 116 and 117 is molded by a synthetic resin member 118. The synthetic resin member 118 is connected to one end of the third shaft 13 so as to be rotatable together.

The torque sensor 44 further includes a pair of collecting magnetic rings 119 and 120 arranged to induce magnetic fluxes from the magnetic yokes 116 and 117. The pair of collecting magnetic rings 119 and 120 is an annular member formed using a soft magnetic material. The collecting magnetic rings 119 and 120 are magnetically coupled to the magnetic yokes 116 and 117, respectively, by surrounding the magnetic yokes 116 and 117.

The pair of collecting magnetic rings 119 and 120 are spaced apart from each other in the axial direction S and opposed to each other. The collecting magnetic rings 119 and 120 are molded by a synthetic resin member 121. The synthetic resin member 121 is held in the annular extension section 92 in the second housing 52.

The magnetic fluxes are generated in the magnetic yokes 116 and 117 according to an amount of relative rotation between the second and third shafts 12 and 13. The magnetic fluxes are induced by the collecting magnetic rings 119 and 120, and are detected by a hall integrated circuit (IC) (not illustrated) buried in the synthetic resin member 121. This enables a magnetic flux density corresponding to a torque applied to the second shaft 12 to be detected.

Referring to FIG. 2, a fifth bearing 35 is arranged on the other side 52 of the axial direction S with respect to the torque sensor 44. The fifth bearing 35 is interposed between a bearing holding section 122 formed on the outer periphery of one end of the third shaft 13 and a bearing holding hole 123 formed in the bulkhead section 93 in the second housing 52. The bearing holding hole 123 rotatably supports one end of the third shaft 13 via the fifth bearing 35.

The third shaft 13 surrounds the second shaft 12 and the torsion bar 14. More specifically, the third shaft 13 has an insertion hole 124, which is opened toward its one end. The other end of the second shaft 12 is inserted through the insertion hole 124. The second shaft 12 has an insertion hole 125 arranged to extend in the axial direction S, and the torsion bar 14 is inserted through the insertion hole 125.

One end of the torsion bar 14 is connected to one end of the insertion hole 125 in the second shaft 12 so as to be rotatable together by serration fitting or the like. The other end of the torsion bar 14 is connected to the insertion hole 124 in the third shaft 13 by serration fitting or the like.

A radially inward space of the annular extension section 92 in the second housing 52 is a torque sensor housing chamber 126. A structure for inhibiting a lubricant from entering the torque sensor housing chamber 126 is further provided.

More specifically, the third bearing 33 with a seal arranged at one end of the annular extension section 92 in the second housing 52, the output member 22 arranged inside in a radial direction of the third bearing 33, and the second shaft 12 arranged inside in a radial direction of the output member 22 close one end of the torque sensor housing chamber 126. The fifth bearing 35 with a seal, the third shaft 13 arranged inside in a radial direction of the fifth bearing 35, and the torsion bar 14 arranged to close the inversion hole 124 in the third shaft 13 close the other end of the torque sensor housing chamber 126.

The above-mentioned configuration can inhibit a lubricant with which each of the first and second uneven engagement sections 64 and 67 are filled from entering the torque sensor housing chamber 126. Moreover, a lubricant with which a meshing area between the worm shaft 27 and the worm wheel 28 in the reduction gear mechanism 26 is filled from entering the torque sensor housing chamber 126.

The second shaft 12 and the third shaft 13 are relatively rotatable via the sixth bearing 36. The worm wheel 28 in the reduction gear mechanism 26 surrounds the sixth bearing 36. The reduction gear mechanism 26 is housed in a housing chamber 128. The housing chamber 128 is defined by an outer peripheral section 127 in the third housing 53, the end wall section 61, and the bulkhead section 93 in the second housing 52. Respective positions of a part of the worm wheel 28 and the sixth bearing 36 overlap each other in the axial direction S.

The seventh bearing 37 is interposed between an intermediate portion of the third shaft 13 and the end wall section 61 in the third housing 53. The end wall section 61 rotatably supports the third shaft 13 via the seventh bearing 37.

An inner ring 371 in the seventh bearing 37 is sandwiched between an annular step 129 formed on the outer periphery of the third shaft 13 and a nut member 130 screwed into the outer periphery of the third shaft 13. An outer ring 372 in the seventh bearing 37 is sandwiched between an annular step 131 formed in the third housing 53 and a retaining ring 132 held in the third housing 53.

As described above, according to the present embodiment, the first and second members 151 and 152 in the inner ring 391 in the bearing ring unit 39 are formed separately from each other and coupled to each other so as to be together movable. The use of such a configuration enables the recesses 66 and 69 from being formed on the corresponding first and second end surfaces 71 and 73 in the inner ring 391 with little time and labor, as described below, for example.

More specifically, the first recess 66 is formed on one end surface (corresponding to the first end surface 71) of a production intermediate of the first member 151. And the second recess 69 is formed on one end surface (corresponding to the second end surface 73) of a production intermediate of the second member 152 independently from product of the first recess 66. Thus, the recesses 66 and 69 are formed on the corresponding first and second end surfaces 71 and 73.

In a configuration different from that in the present embodiment, e.g., when recesses are formed on a pair of end surfaces, which are opposed to each other, of a production intermediate of an inner ring composed of a single member, time-consuming work, as described below, is required. More specifically, such time-consuming work that a recess is formed on one end surface, and a recess is then formed on the other end surface in the state of being positioned with high precision with respect to the recess on the one end surface is required.

On the other hand, according to the present embodiment, the first and second members 151 and 152 can be separately formed, so that the time-consuming work, as described above, is not required.

After the recesses 66 and 69 are formed, the first and second members 151 and 152 may be coupled to each other.

In the inner ring 391, the inner ring main body 153, the first member 151, and the second member 152 are respectively separately formed. Thus, a production intermediate of the inner ring main body 153 is subjected to cutting work in a single-piece state so that the inner ring raceway 168 can be formed.

The relative positions of the recesses 66 and 69 need not be set with high precision when the recesses 66 and 69 are formed so that the inner ring 391 can be manufactured with less time and labor in the present embodiment than when an inner ring is formed by forming an inner ring raceway in addition to forming recesses on a pair of end surfaces of a production intermediate of the inner ring composed of a single member, for example.

A bearing inner ring of a standard size, determined by a standard such as Japanese Industrial Standard (JIS), for example, can be used as the inner ring main body 153, so that the inner ring main body 153 can be formed at lower cost.

Furthermore, the inner ring main body 153 is sandwiched between the first annular flange 155 in the first member 151 and the second annular flange 160 in the second member 152. Thus, a coupling force between the inner ring main body 153 and the first and second members 151 and 152 can be made higher.

In the axial direction S2 of the second axis B, the respective one end surfaces 157 and 163 of the annular flanges 155 and 160 are along the corresponding end surfaces 153b and 153c of the inner ring main body 153, and the respective other end surfaces of the annular flanges 155 and 160 are the corresponding first and second end surfaces 71 and 73. In this case, a thrust force exerted on the first end surface 71 of the inner ring 391 from the input member 20 and a thrust force exerted on the second end surface 73 of the inner ring 391 from the output member 22 are such a force that the annular flanges 155 and 160 fasten the inner ring main body 153 as a whole. This enables the coupling force between the first and second members 151 and 152 and the inner ring main body 153 to be further enhanced.

Furthermore, the inner ring main body 153 and the first and second members 151 and 152 are press-fitted and coupled to each other. This enables coupling strength between the inner ring main body 153 and the first and second members 151 and 152 to be sufficiently ensured. The first and second relief recesses 174 and 176 are provided. This enables a variation in an internal clearance of the bearing ring unit 39, which is caused by the inner ring main body 153 being pressed to the first and second press-fit units 173 and 175 to be suppressed. Therefore, an inner clearance of the bearing ring unit 39 is easy to manage.

The first and second relief recesses 174 and 176 are sandwiched between the first and second press-fit units 173 and 175, and the inner ring raceway 168 and the first and second relief recesses 174 and 176 are opposed to each other in the radial direction R3 of the inner ring 391. This enables the variation in the inner clearance of the bearing ring unit 39, which is caused by the inner ring main body 153 being pressed to each of the press-fit units 173 and 175, to be more reliably suppressed. Therefore, the inner clearance of the bearing ring unit 39 is easier to manage.

Furthermore, the fitting projection 201 at the other end 154*a* of the first cylindrical section 154 and the fitting recess 202 at the other end 159*a* of the second cylindrical section 159 are fitted into each other so that relative rotation between the first and second members 151 and 152 is regulated. This enables the relative rotation between the first and second members 151 and 152 to be reliably regulated. As a result, respective phases of the first recess 66 on the first end surface 71 of the inner ring 391 and the second recess 69 on the second end surface 73 thereof can be inhibited from being shifted in the circumferential direction C1 of the inner ring 391. Therefore, an ideal meshing state between the uneven engagement sections 64 and 67 can be reliably maintained over a long period of time.

The respective other ends 154*a* and 159*a* (opposite ends) of the first and second cylindrical sections 154 and 159 are formed in a rectangular wave shape extending in the circumferential direction C3 of the cylindrical sections 154 and 159 when viewed in the radial direction R2. As a result, the relative rotation between the first and second members 151 and 152 can be reliably regulated by an engagement between the fitting recess 202 and the fitting projection 201.

The outer ring 392 in the bearing ring unit 39 is rotated around the first axis A by the transmission ratio variable mechanism motor 23 so that the inner ring 391 can be rotated around the first axis A. This enables the inner ring 391 to perform Coriolis motion (neck swing motion).

Furthermore, the first uneven engagement sections 64 and the second uneven engagement sections 67 are respectively provided on both sides of the inner ring 391. This enables power to be transmitted between the input member 20 and the output member 22.

The opposite ends 11*a* and 12*a* of the first and second shafts 11 and 12 are supported by the supporting mechanism 133 so as to be relatively rotatable. This enables axial runout at the opposite ends 11*a* and 12*a* of the first and second shafts 11 and 12 to be further reduced. Thus, eccentric rotation of the input member 20 and the output member 22 around the first axis A can be further reduced. As a result, excessive forces can be reliably inhibited from being respectively exerted on the first member 151 and the second member 152 in the inner ring 391 from the input member 20 and the output member 22. As a result, the relative positions of the first and second members 151 and 152 can be reliably prevented from being shifted.

The input member 20 supports the first shaft 11 while supporting the opposite end 12*a* of the second shaft 12 via the eighth bearing 38 in relation to the supporting mechanism 133. Such a simple configuration enables the supporting mechanism 133 to be implemented at low cost. Eccentric rotation of the opposite ends 11*a* and 12*a* of the shafts 11 and 12 around the first axis A can be more reliably reduced.

In such a manner, the vehicle steering apparatus 1 that is manufactured with little time and labor can be implemented.

Furthermore, the steering assist force application mechanism 19 is provided in addition to the transmission ratio variable mechanism 5. This eliminates the need to generate a steering assist force by the transmission ratio variable mechanism motor 23, thereby enabling the transmission ratio variable mechanism motor 23 to be made low in cost and small in size.

The steering assist force generated by the steering assist motor 25 is transmitted to the steering wheels 4R and 4L via the third shaft 13 or the like, and is transmitted to the steering wheels 4R and 4L without via the transmission rate variable mechanism 5. Therefore, a high torque from the steering assist motor 25 can be prevented from being transmitted to the transmission ratio variable mechanism 5, so that an allowable torque of each of components in the transmission ratio variable mechanism 5 can be made lower. As a result, the manufacturing cost of each of the components in the transmission ratio variable mechanism 5 can be further reduced. A torque exerted between the first and second members 151 and 152 in the inner ring 391 may be low, so that the relative positions of the members 151 and 152 can be reliably inhibited from being shifted.

In the first uneven engagement sections 64 provided on the first end surface 71 of the inner ring 391 and the second uneven engagement sections 67 provided on the second end surface 73 of the inner ring 391, pre-loads are respectively applied to areas between the projections 65 and 68 and the corresponding recesses 66 and 69 using the elastic member 113 or the like. Thus, backlash can be prevented from occurring between the projections 65 and 68 and the corresponding recesses 66 and 69 in the first and second uneven engagement sections 64 and 67. Therefore, an engagement noise can be reduced in each of the first uneven engagement sections 64 and the second uneven engagement sections 67.

An urging force produced by the elastic member 113 can be adjusted by adjusting screw amounts of the cover member 135 into the female screw section 134*a*.

Furthermore, the urging force produced by the elastic member 113 can be transmitted to the inner ring 311 in the first bearing 31 via the outer ring 312 in the first bearing 31, so that a pre-load can be reliably applied to the first bearing 31.

A force for the output member 22 to move in the urging direction H1 is applied to the third bearing 33. Therefore, a pre-load can be reliably applied to the third bearing 33.

The second and fourth bearings 32 and 34 support the rotor 231 so as to be movable in the axial direction S. As the inner ring 391 moves in the axial direction of the rotor 231, the outer ring 392 and the rotor 231 can be moved together in the axial direction of the rotor 231. As a result, an unnecessary force can be prevented from being exerted between the inner ring 391 and the outer ring 392.

The present invention is not limited to the contents of the above-mentioned embodiment. Various changes can be made within the scope of the claims.

Figure 5:
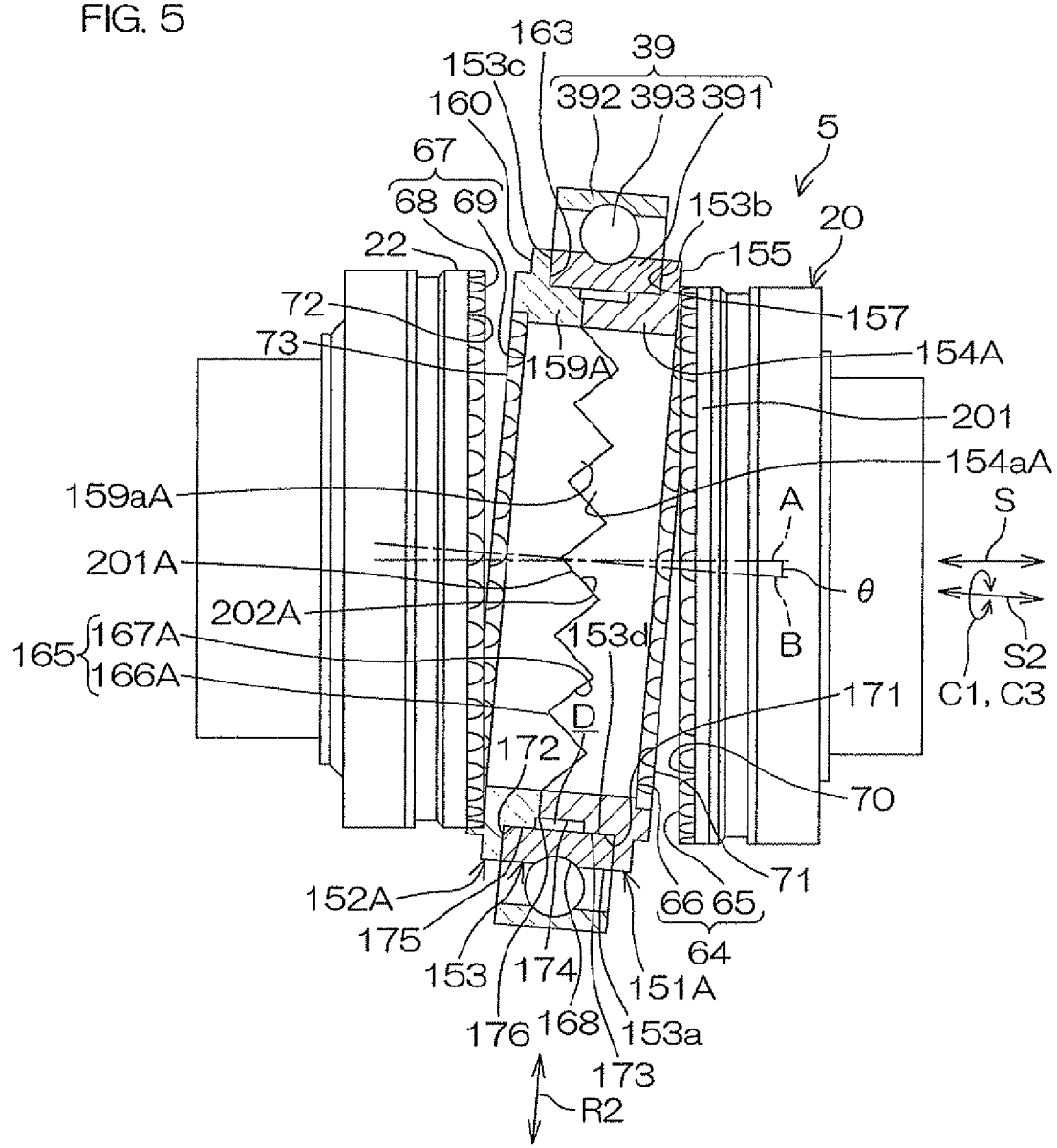
FIG. 5 is a schematic view of a principal part according to another embodiment of the present invention.

For example, the first and second rugged sections 166 and 167 may be replaced with first and second rugged sections 166A and 167A arranged to have a triangular wave shape, as illustrated in FIG. 5.

Each of the other ends 154*a*A and 159*a*A is formed in a triangular wave shape extending in a circumferential direction C3 of a first cylindrical section 154A (second cylindrical section 159A) when viewed in a radial direction R2 of the first cylindrical section 154A (second cylindrical section 159A). Thus, a fitting projection 201A is formed at the other end 154*a*A of the first cylindrical section 154A, and a fitting recess 202A is formed at the other end 159*a* of the second cylindrical section 159A.

Each of the fitting projection 201A and the fitting recess 202A is formed in a triangular wave shape extending in the circumferential direction C3 when viewed in the radial direction R2. The fitting projection 201A and the fitting recess 202A are fitted into each other so that a relative rotation between first and second members 151A and 152A in the circumferential direction C3 is regulated.

In this case, relative rotation between the first and second members 151A and 152A can be reliably regulated by fitting between the fitting recess 202A and the fitting projection 201A arranged to have a triangular wave shape.

Arrangements of the fitting projection 201A and the fitting recess 202A may be replaced with each other.

An inner ring in a bearing ring unit may be driven to rotate by a transmission ratio variable mechanism motor, while an outer ring and an input member may be connected to each other by first uneven engagement sections, and the outer ring and an output member may be further connected to each other by second uneven engagement sections. In this case, the outer ring is a first bearing ring, and the inner ring is a second bearing ring. The outer ring includes a first member arranged to have a first end surface formed on the first member, a second member arranged to have a second end surface formed on the second member, and an outer ring main body fixed to the first and second members, similarly to the inner ring 391.

While the present invention has been described in detail with reference to specific embodiments, it is to be understood that those skilled in the art who have understood the above-mentioned contents will easily consider its changes, modifications, and equivalents. Therefore, the present invention should be within the scope of the claims and their equivalents.

This application claims priority from Japanese Patent Application No. 2008-171450 filed with the Japanese Patent Office on Jun. 30, 2008, which is hereby incorporated by reference herein in its entirety.

DESCRIPTION OF REFERENCE SYMBOLS

1 denotes a vehicle steering apparatus, 2 denotes a steering member, 4R and 4L denote steering wheels, 5 denotes a transmission ratio variable mechanism, 11 denotes a first shaft, 11a denotes an opposite end, 12 denotes a second shaft, 12a denotes an opposite end, 13 denotes a third shaft (a shaft interposed between an output member and the steerable wheel), 19 denotes a steering assist force application mechanism, 20 denotes an input member, 22 denotes an output member, 23 denotes a transmission ratio variable mechanism motor (actuator), 25 denotes a steering assist motor (second actuator), 26 denotes a reduction gear mechanism (transmission mechanism), 38 denotes an eighth bearing (a bearing of a supporting mechanism), 64 denotes first uneven engagement sections, 65 denotes a first projection, 66 denotes a first recess, 67 denotes second uneven engagement sections, 68 denotes a second projection, 69 denotes a second recess, 70 denotes a power transmission surface, 71 denotes a first end surface (another end surface of an annular flange), 72 denotes a power transmission surface, 73 denotes a second end surface (another end surface of an annular flange), 133 denotes a supporting mechanism, 151 and 151A denote first members, 152 and 152A denote second members, 153 denotes an inner ring main body, 153a denotes the outer periphery (of the inner ring main body), 153b and 153c denote end surfaces (of the inner ring main body), 153d denotes the inner periphery (of the inner ring main body), 154 denotes a first cylindrical section, 154a and 154aA denote other ends (opposite ends of the first cylindrical section), 155 denotes a first annular flange, 157 denotes one end surface (of the annular flange), 159 denotes a second cylindrical section, 159a and 159aA denote other ends (opposite ends of the second cylindrical section), 160 denotes a second annular flange, 163 denotes one end surface (of the annular flange), 168 denotes an inner ring raceway, 171 denotes an outer peripheral surface (of the first cylindrical section), 172 denotes an outer peripheral surface (of the second cylindrical section), 173 denotes a first press-fit section, 174 denotes a first relief recess, 175 denotes a second press-fit section, 176 denotes a second relief recess, 200 denotes an annular section, 201 and 201A denote fitting projections, 202 and 202A denote fitting recesses, 231 denotes a rotor, 232 denotes a stator, 391 denotes an inner ring (a first bearing ring), 392 denotes an outer ring (a second bearing ring), 393 denotes a rolling element, A denotes a first axis, B denotes a second axis, C3 denotes a circumferential direction (of the cylindrical section), D denotes a clearance, R2 denotes a radial direction (of the cylindrical section), R3 denotes a radial direction (of the inner ring), S2 denotes an axial direction (of the second axis), θ1 denotes a steering angle, θ2 denotes a steered angle, and θ2/θ1 denotes a transmission ratio.

The invention claimed is:

1. A transmission ratio variable mechanism comprising:
an input member arranged to rotate around a first axis;
an output member arranged to rotate around the first axis;
a first bearing ring having first and second end surfaces and arranged to connect the input member and the output member so as to be differentially rotatable;
a second bearing ring arranged to support the first bearing ring via a rolling element so as to be rotatable; and
an actuator arranged to drive the second bearing ring to rotate,
wherein a second axis serving as a center axis of the first and second bearing rings is inclined to the first axis,
each of the input member and the output member includes a power transmission surface opposed to the corresponding end surface of the first bearing ring,
the transmission ratio variable mechanism further comprising uneven engagement sections arranged to engage each of the end surface of the first bearing ring and the power transmission surface corresponding to the end surface so as to be power-transmittable,
wherein the uneven engagement sections include a projection provided on one of each of the end surfaces of the first bearing ring and the power transmission surface corresponding to the end surface and a recess provided on the other surface and arranged to engage with the projection,
the first bearing ring includes a first member forming the first end surface and a second member forming the second end surface, and
the first and second members are formed separately from each other and coupled to each other so as to be movable together.

2. The transmission ratio variable mechanism according to claim 1, wherein
the first bearing ring is an inner ring,
the inner ring includes an annular inner ring main body arranged to have an inner ring raceway formed on its outer periphery, and
the first and second members are fixed to the inner ring main body.

3. The transmission ratio variable mechanism according to claim 2, wherein
each of the first and second members includes a cylindrical section fitted into the inner periphery of the inner ring main body, and an annular flange arranged to extend outward in a radial direction of the cylindrical section from one end of the cylindrical section and along a corresponding end surface of the inner ring main body, and
the first and second end surfaces of the inner ring serving as the first bearing ring are provided in each of the annular flanges.

4. The transmission ratio variable mechanism according to claim 3, wherein
the one end surface of each of the annular flanges is along the corresponding end surface of the inner ring main body in an axial direction of the second axis, and the other end surfaces of the annular flanges are respectively the corresponding first and second end surfaces.

5. The transmission ratio variable mechanism according to claim 3, wherein
each of the outer peripheries of the cylindrical sections in the first and second members includes a press-fit unit that is press-fitted into the inner periphery of the inner ring main body and a relief recess that is recessed with respect to the press-fit unit,
a clearance is provided between the relief recess and the inner periphery of the inner ring main body, and
the relief recesses in the first and second members are arranged adjacent to each other between the press-fit units in the first and second members in an axial direction of the inner ring.

6. The transmission ratio variable mechanism according to claim 5, wherein the inner ring raceway and each of the relief recesses are opposed to each other in a radial direction of the inner ring.

7. The transmission ratio variable mechanism according to claim 3, wherein
the cylindrical sections in the first and second members respectively include opposite ends opposed to each other, and
a fitting recess formed at one of the opposite ends and a fitting projection formed at the other end are fitted into each other so that relative rotation between the first and second members is regulated.

8. The transmission ratio variable mechanism according to claim 7, wherein
each of the opposite ends is formed in a rectangular wave shape extending in a circumferential direction of the cylindrical section when viewed in the radial direction of the cylindrical section.

9. The transmission ratio variable mechanism according to claim 7, wherein
each of the opposite ends is formed in a triangular wave shape extending in a circumferential direction of the cylindrical section when viewed in the radial direction of the cylindrical section.

10. The transmission ratio variable mechanism according to claim 1, wherein
the actuator includes a motor for the transmission ratio variable mechanism, and
the motor for the transmission ratio variable mechanism includes a rotor connected to the second bearing ring so as to be rotatable together around the first axis, and a stator arranged to surround the rotor.

11. The transmission ratio variable mechanism according to claim 1, wherein
the uneven engagement sections include first uneven engagement sections and second uneven engagement sections,
the first uneven engagement sections include a first projection provided on one of the power transmission surface of the input member and the first end surface of the first bearing ring, and a first recess provided on the other surface, and
the second uneven engagement sections include a second projection provided on one of the power transmission surface of the output member and the second end surface of the first bearing ring, and a second recess provided on the other surface.

12. The transmission ratio variable mechanism according to claim 1, further comprising a first shaft connected to the input member so as to be rotatable together, and a second shaft connected to the output member so as to be rotatable together,
the first shaft and the second shaft respectively arranged to include opposite ends opposed to each other, and
a supporting mechanism arranged to support each of the opposite ends so as to be relatively rotatable.

13. The transmission ratio variable mechanism according to claim 12, wherein
the supporting mechanism includes an annular section provided in the input member and arranged to surround the opposite end of the second shaft, and a bearing interposed between the annular section and the opposite end of the second shaft.

14. A vehicle steering apparatus comprising:
a steering member;
a steerable wheel; and
a transmission ratio variable mechanism arranged to change a transmission ratio serving as a ratio of a steered angle of the steerable wheel to a steering angle of the steering member,
the transmission ratio variable mechanism including:
an input member arranged to rotate around a first axis;
an output member arranged to rotate around the first axis;
a first bearing ring having first and second end surfaces and arranged to connect the input member and the output member so as to be differentially rotatable;
a second bearing ring arranged to support the first bearing ring via a rolling element so as to be rotatable; and
an actuator arranged to drive the second bearing ring to rotate,
wherein a second axis serving as a center axis of the first and second bearing rings is inclined to the first axis,
each of the input member and the output member includes a power transmission surface opposed to the corresponding end surface of the first bearing ring,
the transmission ratio variable mechanism further including uneven engagement sections arranged to engage each of the end surfaces of the first bearing ring and the power transmission surface corresponding to the end surface so as to be power-transmittable,
the uneven engagement sections include a projection provided on one of each of the end surfaces of the first bearing ring and the power transmission surface corresponding to the end surface and a recess provided on the other surface and arranged to engage with the projection,
the first bearing ring includes a first member forming the first end surface and a second member forming the second end surface,
the first and second members are formed separately from each other and coupled to each other so as to be movable together,
the input member in the transmission ratio variable mechanism connects to the steering member, and
the output member in the transmission ratio variable mechanism connects to the steerable wheel.

15. The vehicle steering apparatus according to claim 14, further comprising a steering assist force application mechanism.

16. The vehicle steering apparatus according to claim 15, further comprising
a shaft interposed between the output member and the steerable wheel,
wherein the steering assist force application mechanism includes a second actuator arranged to generate a steering assist force, and a transmission mechanism arranged to transmit the steering assist force to the shaft.

* * * * *

UNITED STATES PATENT AND TRADEMARK OFFICE
CERTIFICATE OF CORRECTION

PATENT NO. : 8,245,814 B2
APPLICATION NO. : 13/000484
DATED : August 21, 2012
INVENTOR(S) : Atsushi Yao et al.

It is certified that error appears in the above-identified patent and that said Letters Patent is hereby corrected as shown below:

Title page, item (73) Assignee
"JTekt Corporation, Osaka-Shi (JP)"

should read

--JTEKT Corporation, Osaka-Shi (JP)--

Signed and Sealed this
Eleventh Day of December, 2012

David J. Kappos
*Director of the United States Patent and Trademark Office*